No. 854,130. PATENTED MAY 21, 1907.
W. W. VERNER.
CONCRETE BLOCK MACHINE.
APPLICATION FILED MAY 9, 1906.
3 SHEETS—SHEET 1.
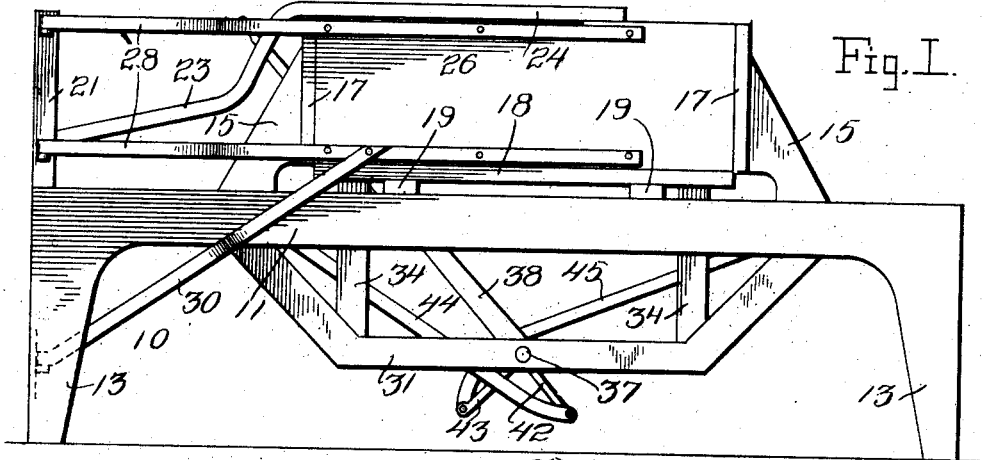
Fig. 1.
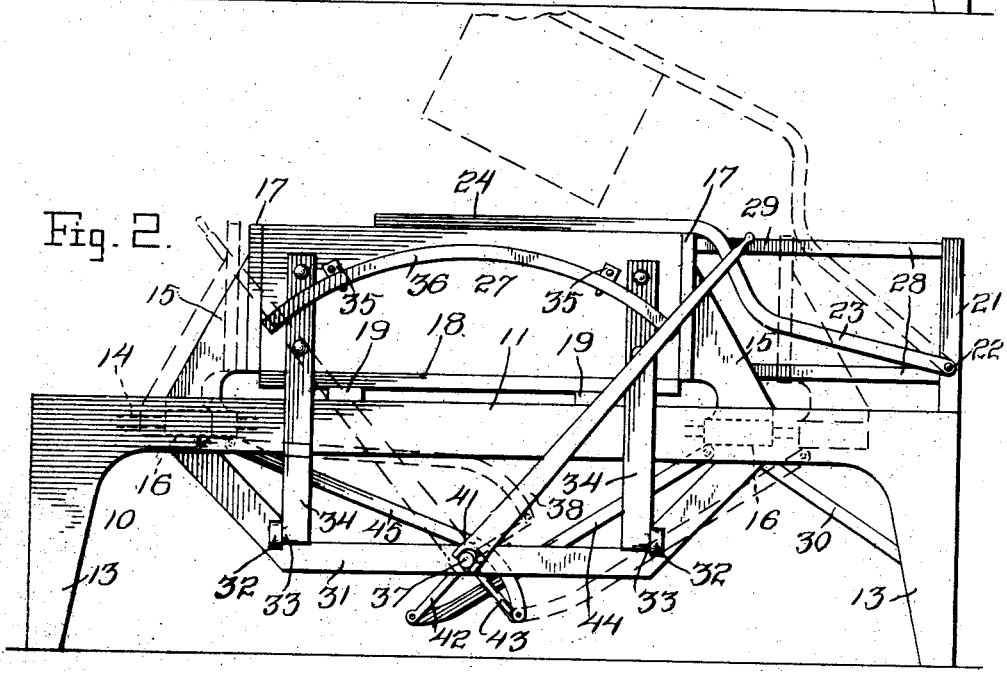
Fig. 2.
Witnesses
Inventor
W. W. Verner.
Attorneys No. 854,130. PATENTED MAY 21, 1907.
W. W. VERNER.
CONCRETE BLOCK MACHINE.
APPLICATION FILED MAY 9, 1906.

3 SHEETS—SHEET 2.

Witnesses
E. K. Reichenbach.
F. B. MacNab.

Inventor
W. W. Verner.
By Chandler & Chandler
Attorney

No. 854,130. PATENTED MAY 21, 1907.
W. W. VERNER.
CONCRETE BLOCK MACHINE.
APPLICATION FILED MAY 9, 1906.

3 SHEETS—SHEET 3.

Witnesses
C. K. Reichenbach
F. B. MacNab

Inventor
W. W. Verner
By Chandlee & Chandlee
Attorneys

UNITED STATES PATENT OFFICE.

WALTER W. VERNER, OF DELMONT, SOUTH DAKOTA.

CONCRETE-BLOCK MACHINE.

No. 854,130.　　　Specification of Letters Patent.　　　Patented May 21, 1907.

Application filed May 9, 1906. Serial No. 315,967.

*To all whom it may concern:*

Be it known that I, WALTER W. VERNER, a citizen of the United States, residing at Delmont, in the county of Douglas, State of South Dakota, have invented certain new and useful Improvements in Concrete-Block Machines; and I do hereby declare the following to be a full, clear, and exact description of the invention, such as will enable others skilled in the art to which it appertains to make and use the same.

This invention relates to machines for molding blocks of plastic material and more particularly to that class designed for manufacturing blocks having continuous air spaces formed therein.

The primary object of the invention is to provide a block molding machine having movable mold members which may be operated simultaneously and by the movement of a single lever.

A further object of the invention resides in the provision of a mold member including means for holding anchors which, when the block sections harden, hold the said sections together.

With the above and other objects in view the invention consists in the novel construction and arrangement of parts hereinafter fully described, shown in the accompanying drawings and particularly pointed out in the appended claims it being understood that various changes in the form, size, proportion and minor details may be made within the scope of the claims without departing from the spirit or sacrificing any of the advantages of the invention.

Figure 3:
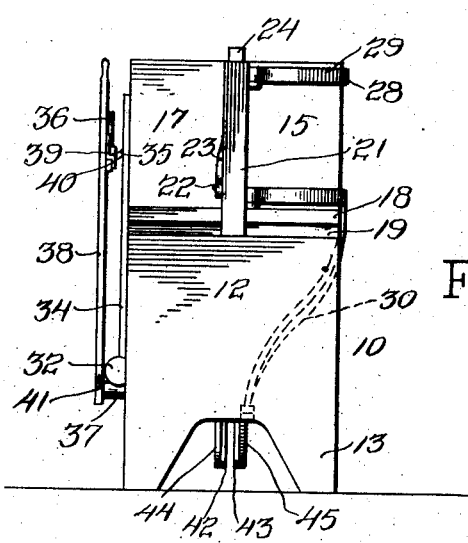
Figure 4:
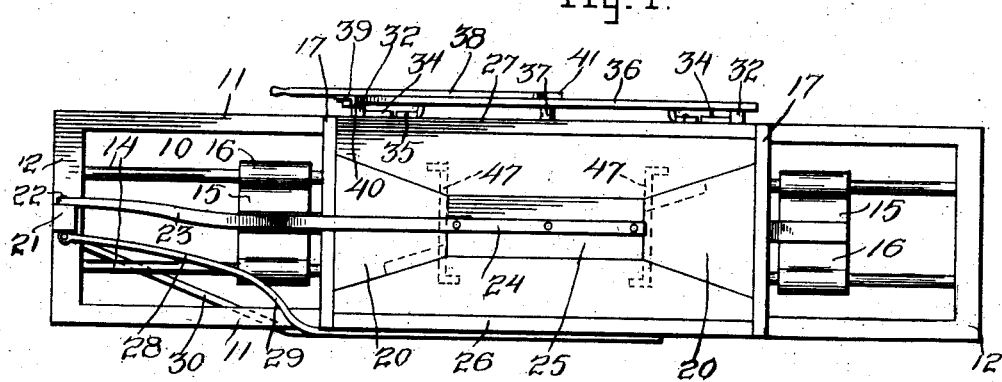
Figure 5:
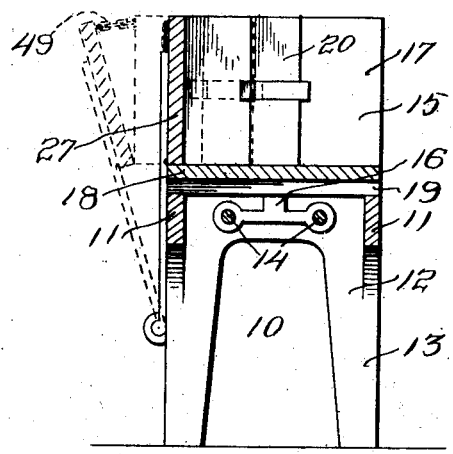
Figure 6:
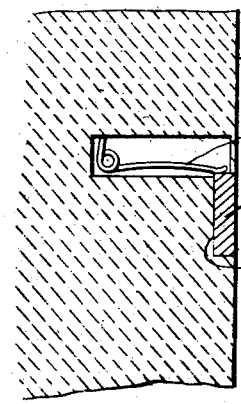
Figure 7:
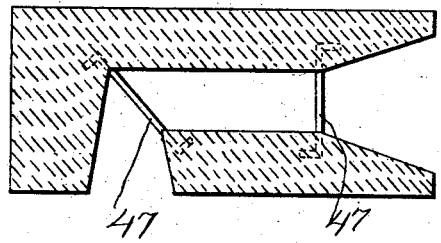

In the accompanying drawings: Figure 1 is a front elevation of the block molding machine. Fig. 2 is a rear elevation of the same and showing in dotted lines, the position of the parts when the mold members are retracted. Fig. 3 is a view in elevation of one end of the machine. Fig. 4 is a top plan view of the machine. Fig. 5 is a vertical sectional view showing a slightly modified form of the invention. Fig. 6 is a detail view of a portion of one of the mold members showing the means for holding the anchors, and, Fig. 7 is a detail view of a modified form of block, such as is produced by the modified form of mold.

Referring to the drawings, the numeral 10 designates the supporting frame for the machine, the said frame comprising parallel side members 11, end members 12 connecting the side members, and supporting legs or standards 13. Mounted at their ends in the end connecting members 12 are rods 14 which lie parallel to each other and upon which are slidably mounted standards 15, including each a base 16 provided with openings for the passage of the rods 14. Secured to the opposing vertical edges of the standards 15 are plates 17 which form the ends of the mold proper. A base board 18 is provided upon its under face with transversely extending cleats 19 which are arranged to rest upon the upper edges of the side members 11 to removably support the base board 18 thereon, the said base board when in position upon the frame 10 having its upper face in a common plane with the lower edges of the end plates 17. Bolted or otherwise secured to the opposing faces of the end plates 17 are mold members 20 which may be of any desired form and which have their upper and lower faces located in a common plane with the upper and lower edges respectively of the plate 17 to which they are attached.

Mounted at one end of the frame 10 upon one of the end connecting members 12 is a standard 21 to which is pivoted as at 22 one end of a bar 23. The said bar is pivoted adjacent the lower end of the standard and from its pivotal point, extends upwardly to a point in rear of the adjacent plate 17 and thence extends horizontally as at 24 in a plane with the upper edge of said plate. Secured in any suitable manner to the underside of the horizontally extending portion 24 of the bar 23 is a mold member 25 which when the mold is in closed position lies intermediate the opposing edges of the mold members 20 with its end abutting the said edges of the mold members.

In order to complete the mold proper, I provide front and rear mold plates 26 and 27 respectively whose vertical edges register with the adjacent vertical edges of the end plates 17 when the mold is in closed position. Secured to the outer face of the front plate 26 is a pair of bars 28 which are hingedly connected at their extreme outer end to the standard 21, the said bars being bent as at 29 to extend inwardly to connect with the standard 21 as stated, this bending of the bars 28 and also of the bar 23 being for a purpose to be hereinafter stated.

To prevent sagging of the end plate 26 by reason of its weight, I provide a brace bar 30 which is connected at its upper end to the said plate and at its lower is hinged to the adjacent one of the legs or standards 13.

Secured to each of the side members 11 and depending therefrom are brackets 31 and secured upon one of the brackets is a pair of socket bearings 32 in which are received pintles 33 formed on the lower end of the bars 34 which are secured at their upper end to the back plate 27, thus serving to hingedly mount the said plate. Secured to the said back plate by means of brackets 35 and in spaced relation thereto, is an arcuate plate 36.

Mounted to rock in the brackets 31 is a shaft 37, to one end of which is secured the lower end of a lever 38 by means of which the said shaft may be rocked. The said lever is provided with a bracket 39 upon its side adjacent the back plate 29, the said bracket including a downwardly directed off-set portion 40 which is engaged behind the arcuate plate 36 to guide the lever during its rocking movement.

In order that the back plate may have a free swinging movement, the lower end of the lever 38 is forked, as at 41 and provided with oppositely directed pintle lugs which are pivotally engaged in recesses in the shaft 37, this connection permitting swinging of the lever in a common direction with the back plate 27 but still allowing to perform its function of rocking the shaft 37.

Secured to the shaft 37 are crank arms 42 and 43 which extend downwardly in diverging planes and to the lower ends of which are pivotally connected the lower ends of the rods 44 and 45 respectively, the said rods lying one above the other below the said shaft and having their said ends curved to receive the shaft in their concavities at times. At their upper ends the rods 44 and 45 are pivotally connected with the bases 16 of the standards 15.

Formed in the vertical edges of each of the mold members 20 are recesses 46 for the reception of anchors 47, the said anchors being held in the said recesses by means of spring-fingers 48 which are seated in recesses formed in one of the side faces of each mold member as shown in Fig. 6.

In making the form of block shown in Fig. 7 one of the mold members 20 instead of being connected with the end plate is hinged at its lower edge to the lower edges of the back plate 27 and is connected at its upper edge therewith by means of a chain 49, this connection permitting the mold member to be withdrawn from the mold in a horizontal position until clear of the block.

From the foregoing it will be seen that when the shaft 37 is rocked the end plates and their related parts will be moved in opposite directions and from each other and that one of the plates will engage the bent portion of the rod 23 to swing the same and the mold member 25 upwardly, and the curved portion of the bars 28 to swing the front plate outwardly. It will also be seen that the lever may be swung rearwardly to carry the plate 25 out of contact with the block being formed. Furthermore, it will be seen that the bend of the bar 23 is such that the mold member 25 will not start on its upward swinging movement until the mold members 20 have moved partially away from the block.

Having thus described my invention, what I claim, is:—

1. A device of the class described comprising a frame, slidable mold members mounted in the frame, and a mold member mounted in the frame for vertical swinging movement and arranged for actuation by one of the sliding mold members after the same has been partially retracted.

2. A device of the class described comprising sliding mold members, a hinged mold member, a rock shaft, connections between the rock shaft and the sliding mold members for movement of the latter, a lever pivotally connected with the rock shaft for movement thereof, and means carried by the hinged mold member for guiding the lever and holding the same in vertical position.

3. A device of the class described comprising a frame, movable mold members mounted in the frame, and a swinging mold member arranged for movement by said first named members after the first-named members have been partially retracted.

4. A device of the class described comprising a frame, mold members slidably mounted upon the frame, a hinged mold member, a rock shaft, and means for rocking the shaft, connections between the rock shaft and the sliding mold members for actuation of the latter when the former is rocked, said sliding mold members being arranged to actuate the swinging mold member after having been partially retracted.

In testimony whereof, I affix my signature, in presence of two witnesses.

WALTER W. VERNER.

Witnesses:
 GEO. D. CORD,
 GUSTAVE KNOLLER.